(12) United States Patent
Hagiopol et al.

(10) Patent No.: US 7,897,013 B2
(45) Date of Patent: Mar. 1, 2011

(54) BLENDS OF GLYOXALATED POLYACRYLAMIDES AND PAPER STRENGTHENING AGENTS

(75) Inventors: Cornel Hagiopol, Lilburn, GA (US); Yuping Luo, Duluth, GA (US); David F. Townsend, Grayson, GA (US); James W. Johnston, Suwanee, GA (US); Clay E. Ringold, Decatur, GA (US); Karla D. Favors, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 12/275,619

(22) Filed: Nov. 21, 2008

(65) Prior Publication Data

US 2009/0165978 A1 Jul. 2, 2009

Related U.S. Application Data

(63) Continuation of application No. 10/919,488, filed on Aug. 17, 2004, now Pat. No. 7,488,403.

(51) Int. Cl.
*D21H 17/55* (2006.01)
*C08F 8/00* (2006.01)
*D21H 21/20* (2006.01)

(52) U.S. Cl. .................. 162/166; 162/158; 162/164.3; 162/168.3; 525/328.2; 525/329.4; 525/383

(58) Field of Classification Search ................ 162/158, 162/164.3, 166, 168.3; 525/328.2, 329.4, 525/383
See application file for complete search history.

(56) References Cited

U.S. PATENT DOCUMENTS

| | | | |
|---|---|---|---|
| 3,556,932 A | 1/1971 | Coscia et al. |
| 3,773,612 A | 11/1973 | Avis |
| 4,060,507 A | 11/1977 | Floyd et al. |
| 4,217,425 A | 8/1980 | Ballweber et al. |
| 4,508,594 A | 4/1985 | Jansma et al. |
| 4,603,176 A | 7/1986 | Bjorkquist et al. |
| 4,605,702 A | 8/1986 | Guerro et al. |
| 4,605,718 A | 8/1986 | Jansma et al. |
| 4,785,055 A | 11/1988 | Dexter et al. |
| 4,853,431 A | 8/1989 | Miller |
| 4,954,538 A | 9/1990 | Dauplaise et al. |
| 4,966,652 A | 10/1990 | Wasser |
| 5,147,908 A | 9/1992 | Floyd et al. |
| 5,401,810 A | 3/1995 | Jansma et al. |
| 5,427,652 A | 6/1995 | Darlington et al. |
| 5,466,337 A | 11/1995 | Darlington et al. |
| 5,567,798 A | 10/1996 | Dulany et al. |
| 5,674,362 A | 10/1997 | Underwood et al. |
| 5,763,523 A | 6/1998 | Chen et al. |
| 5,763,530 A | 6/1998 | Chen et al. |
| 5,783,041 A | 7/1998 | Underwood |
| 5,869,589 A | 2/1999 | Raynolds et al. |
| 5,883,181 A | 3/1999 | Cicchiello et al. |
| 5,914,366 A | 6/1999 | Cicchiello et al. |
| 5,951,719 A | 9/1999 | Cooper et al. |
| 6,077,394 A | 6/2000 | Spence et al. |
| 6,080,804 A | 6/2000 | Davies et al. |
| 6,197,919 B1 | 3/2001 | Crisp et al. |
| 6,306,480 B1 | 10/2001 | Yardley et al. |
| 6,380,353 B1 | 4/2002 | Rupaner et al. |
| 6,429,253 B1 | 8/2002 | Guerro et al. |
| 6,491,790 B1 | 12/2002 | Proverb et al. |
| 7,034,087 B2 | 4/2006 | Hagiopol et al. |
| 7,119,148 B2 | 10/2006 | Hagiopol et al. |
| 2002/0134521 A1 | 9/2002 | Shannon et al. |
| 2006/0037727 A1 | 2/2006 | Hagiopol et al. |
| 2006/0041085 A1 | 2/2006 | Hagiopol et al. |

(Continued)

FOREIGN PATENT DOCUMENTS

WO  97/30118  8/1997

(Continued)

OTHER PUBLICATIONS

Definition of "adjunct", Merriam-Webster Online Dictionary. 2009, [retrieved on Dec. 31, 2009], Retrieved from the Internet, :<http://www.merriam-webster.com/dictionary/adjunct>.*

(Continued)

*Primary Examiner*—Eric Hug
*Assistant Examiner*—Dennis Cordray
(74) *Attorney, Agent, or Firm*—Michael S. Kerns

(57) ABSTRACT

Compositions comprising a blend of two or more paper strengthening agents have improved stability compared with previously known paper strengthening agents. One component is a polymeric paper strengthening agent, preferably a wet strengthening agent. The other component is a stabilized polyacrylamide prepared by (1) reacting a first portion of glyoxal with a polyacrylamide having pendant amide groups to form a first reaction mixture comprising polyacrylamide; (2) adding an acid to the first reaction mixture to form a second reaction mixture having a reduced pH and comprising the polyacrylamide; and (3) adding a second portion of glyoxal to the second reaction mixture to form the stabilized polyacrylamide. If desired, an aldehyde scavenger can be included in one or more of step (1), step (2), step (3), or the stabilized polyacrylamide. Such compositions can be used to enhance the strength of paper, particularly the wet strength of paper.

27 Claims, 1 Drawing Sheet

U.S. PATENT DOCUMENTS

2006/0270801 A1  11/2006  Hagiopol et al.
2007/0078233 A1   4/2007  Proverb et al.
2008/0149287 A1   6/2008  Hagiopol et al.

FOREIGN PATENT DOCUMENTS

WO    WO 00/11046    *   3/2000
WO    2008/011138 A1     1/2008

OTHER PUBLICATIONS

International Search Report and Written Opinion for PCT/US2009/065343, mailed Feb. 4, 2010, 11 pages, European Patent Office, Rijswijk, Netherlands.

* cited by examiner

US 7,897,013 B2

BLENDS OF GLYOXALATED POLYACRYLAMIDES AND PAPER STRENGTHENING AGENTS

CROSS-REFERENCE TO RELATED APPLICATIONS

This application is a continuation-in-part application of U.S. patent application Ser. No. 10/919,488, filed on Aug. 17, 2004, now U.S. Pat. No. 7,488,403, the disclosure of which is incorporated herein by reference in its entirety.

FIELD OF THE INVENTION

The invention relates to paper strengthening agents, particularly wet strengthening agents.

BACKGROUND OF THE INVENTION

Paper is sheet material containing interconnected small, discrete fibers. The fibers are usually formed into a sheet on a fine screen from a dilute water suspension or slurry. Paper typically is made from cellulose fibers, although occasionally synthetic fibers are used.

Paper products made from untreated cellulose fibers lose their strength rapidly when they become wet, i.e., they have very little wet strength. The wet strength of paper is defined (U.S. Pat. No. 5,585,456) as the resistance of the paper to rupture or disintegration when it is wetted with water. Wet strength of ordinary paper is only about 5% of its dry strength. To overcome this disadvantage, various methods of treating paper products have been employed.

Wet strength resins applied to paper are either of the "permanent" or "temporary" type, which are defined by how long the paper retains its wet strength after immersion in water. While wet strength retention is a desirable characteristic in packaging materials, it presents a disposal problem. Paper products having such characteristics are degradable only under undesirably severe conditions. While some resins are known which impart temporary wet strength and thus would be suitable for sanitary or disposable paper uses, they often suffer from one or more drawbacks. For example, their wet strength is generally of a low magnitude (about one-half of the level achievable for permanent-type resins); they are easily attacked by mold and slime; or they can only be prepared as dilute solutions.

There is a continuing need in the art for methods of imparting appropriate levels of wet strength and repulpability to paper productcas.

SUMMARY OF THE INVENTION

Compositions of the present invention comprise a blend of two components. One component is a polymeric paper strengthening agent, preferably a wet strengthening agent. The other component is a stabilized polyacrylamide prepared by (1) reacting a first portion of glyoxal with a polyacrylamide having pendant amide groups to form a first reaction mixture comprising polyacrylamide; (2) adding an acid to the first reaction mixture to form a second reaction mixture having a reduced pH and comprising the polyacrylamide; and (3) adding a second portion of glyoxal to the second reaction mixture to form the stabilized polyacrylamide. If desired, an aldehyde scavenger can be included in one or more of step (1), step (2), step (3), or the stabilized polyacrylamide.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION OF THE INVENTION

Figure 1:
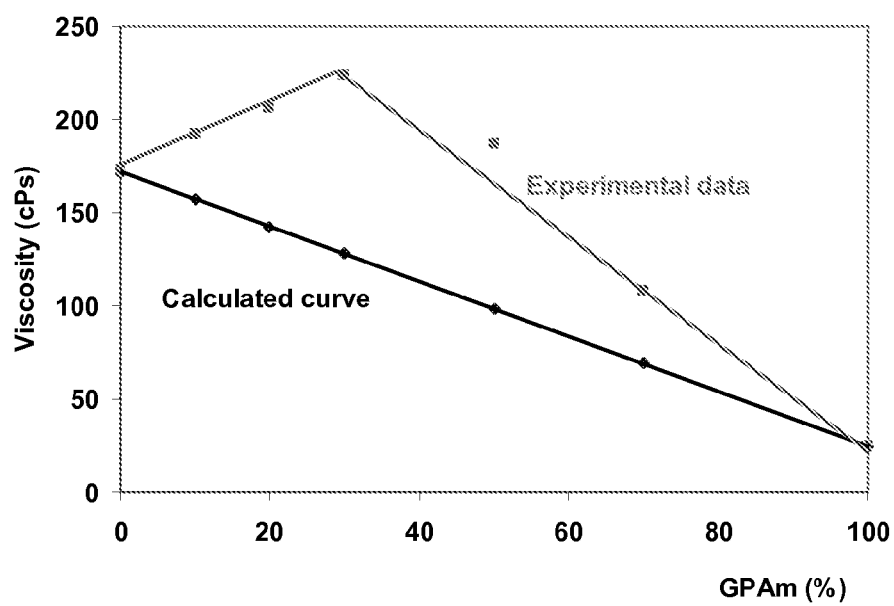
FIG. 1 is an illustration of the calculated data and results of the experimental data from several glyoxalated polyacrylamide/PAE resin compositions.

The present invention provides compositions for enhancing the strength of paper, particularly the wet strength of paper and/or the repulbability of the paper.

Compositions of the invention comprise two components. One component is one or more polymeric paper strengthening agents, preferably wet strengthening agent(s). The other component is a stabilized polyacrylamide prepared by (1) reacting a first portion of glyoxal with a polyacrylamide having pendant amide groups to form a first reaction mixture comprising polyacrylamide; (2) adding an acid to the first reaction mixture to form a second reaction mixture having a reduced pH and comprising the polyacrylamide; and (3) adding a second portion of glyoxal to the second reaction mixture to form the stabilized polyacrylamide. If desired, an aldehyde scavenger can be included in one or more of step (1), step (2), step (3), or the stabilized polyacrylamide. In one embodiment, the stabilized polyacrylamide is present in a concentration of between about 1% and about 99% by weight of the two components. In further embodiments, the lower limit of stabilized polyacrylamide present in a concentration can be 1, 5, 10, 15, 20, 25, 30, 35, 40, 45, 50, 55, 60, 65, or 70% by weight of the two components. The upper limit of the stabilized polyacrylamide present in a concentration can be 99, 95, 90, 85, 80, 75, 70, 65, 60, 55, 50, 45, 40, 35, or 30% by weight of the two components. In any embodiment, any described upper limit may be combined with any of the described lower limit. The final blend also can contain an aldehyde scavenger, which further enhances its stability.

Paper strengthened with some compositions of the invention can be defibered and repulped in neutral water without extraordinary processes. The interpolymer networks formed by the blend inside the paper readily break down during repulping. The term "polymer" is used throughout this specification in its conventional sense to refer to compounds made from smaller monomers and having a molecular weight of about 500 to 1000 or higher. The term "monomer" is used herein to refer to compounds that are not polymeric and which can polymerize in order to generate a "polymer."

As used herein, "crosslinked" and similar terms are intended to embrace the structural and/or morphological change that occurs, for example, by covalent chemical reaction or ionic interaction between separate molecules in a composition.

Stabilized Glyoxalated Polyacrylamide

Preparation of Stabilized Glyoxalated Polyacrylamide Compositions

The stabilized polyacrylamide component of the disclosed blends is prepared by glyoxalating a base polyacrylamide according to the method described below. The base polyacrylamide, which is in accordance with the method outlined above, can be prepared by free radical polymerization of a base acrylamide monomer in an aqueous system using a chain transfer agent, such as 2-mercaptoethanol. Methods for making polyacrylamide polymers are well known in the prior art.

Base Acrylamide Monomer

A base acrylamide monomer provides the primary reaction sites on the base polymer backbone to which the glyoxal substituents are attached. The base polymer must have a sufficient number of base acrylamide monomers in its structure (pendant amide groups) so that, once functionalized with glyoxal, the resulting polymer is thermosetting. Generally, the amount of base acrylamide monomer should be at least about 10 mole percent based on the total number of monomers used to prepare the base polyacrylamide polymer. Higher amounts are usually preferred as this has a beneficial effect on the paper strengthening properties of the resulting polymer. As a result, the base acrylamide monomer is normally provided in an amount of at least about 50 mole percent and sometimes in excess of 75 mole percent of the total number of vinyl monomers from which the base polyacrylamide is prepared.

The term "base acrylamide monomer" is intended to embrace primary vinylamides including not only acrylamide itself but also substituted acrylamides such as methacrylamide, ethylacrylamide, crotonamide, N-methyl acrylamide, N-butyl acrylamide, N-ethyl methacrylamide and the like. Thus, polyacrylamides, which by definition are polymers made from acrylamide monomers, include repeating units from at least some of these various compounds.

Cationic Co-Monomer

In addition to the base acrylamide monomer, the reaction mixture also includes a sufficient amount of an unsaturated cationic co-monomer to provide the ultimate polyacrylamide polymer with a suitable cationic character for strengthening paper. The amount of cationic components preferably is sufficient to render the modified polyacrylamide polymer self-substantive to cellulose fibers in aqueous suspensions. The quantity of polymer retained on the cellulose fibers can be determined by measuring the nitrogen content of the fibers both before and after treatment with the polyacrylamide composition.

Typically, a few cationic monomers, and in some case a single monomer, in each base polymer molecule may be sufficient to provide the polymer with an adequate cationic character to make the polymer substantive to cellulose fibers. A polymer with a suitable amount of cationic character thus can usually be obtained by including at least about 0.001 mole of cationic monomer and upwards of 0.25 mole and possibly more of cationic monomer, per mole of acrylamide monomer in the reaction mixture. Usually an amount between 0.01 and 0.15 mole of cationic monomer per mole of acrylamide monomer should be satisfactory, with an amount between 0.02 and 0.10 being more typical.

Suitable co-monomers for conferring a cationic character to the base polyacrylamide polymer when dissolved in water include a diallyl quaternary monomer (generally diallyl dimethyl ammonium chloride, DADMAC), 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride, 2-(dimethylamino) ethyl acrylate, and mixtures thereof. In addition to chloride, the counterion for the cationic monomers also can be fluoride, bromide, iodide, sulfate, methylsulfate, phosphate and the like.

In order to prepare a polyacrylamide of a desired chemical composition and monomer distribution, the full complement of the cationic co-monomer(s) can be added all at once at the beginning of the polyacrylamide polymerization reaction. Alternatively, the cationic co-monomer(s) can be added continuously along with base acrylamide monomers over the time course of the polymerization reaction, or in yet another embodiment the full complement of the co-monomer(s) can be added all at once, but only after a certain conversion of base acrylamide to form a polyacrylamide homopolymer has occurred. Still other options for reacting the cationic co-monomer with the base acrylamide monomer/polyacrylamide polymer will be recognized by those skilled in the art.

Other Monomers

Other vinyl monomers that can be present during preparation of the base polyacrylamide and thus become incorporated into the base polymer include (1) diluter monomers, i.e., monomers that reduce the concentration of required monomers is each polymer but do not provide any functional site for modification of the polymer, and (2) other functional monomers, i.e., non-amide vinyl monomers that can be incorporated into the base polymer and have pendant groups that also may react with glyoxal.

Diluter monomers include, for example, acrylic esters such as ethyl acrylate, methylmethacrylate and the like, acrylonitrile, vinyl acetate, N-vinyl pyrrolidone, N,N'-dimethyl acrylamide, hydroxy alkyl (meth) acrylates, styrene and the like.

Functional monomers include, for example, allylglycidal ether, glycidyl methacrylate and the like. Of a special interest are those co-monomers with a 1,2-diol in their structure, such as 3-allyloxy-1,2-propandiol, 3-acryloyloxy-1,2-propandiol and methacryloyloxy-1,2-propandiol.

The diluter monomers can be present in the reaction mixture in an amount of up to about 0.5 mole per mole of acrylamide monomer, while the amount of functional monomers should not exceed about 0.15 mole per mole of acrylamide monomer. The amount and ratio of the diluter and functional monomers in the reaction mixture can be used as another control of the extent and distribution of glyoxalation.

Suitable base polymers, for example, can be prepared from a mixture of acrylamide and diallyldimethyl ammonium chloride in a molar ratio between 99:1 and 75:25.

In an alternative embodiment, a di-functional co-monomer can be used in order to obtain a branched polyacrylamide polymer structure. N,N'-methylene-bisacrylamide, N,N'-methylene-bismethacrylamide, N-allyl acrylamide and N-allyl methacrylamide are recommended as a di-functional co-monomers if a structure with added branching is desired.

Free Radical Polymerization

As noted above, the polyacrylamide is prepared by free radical polymerization among the base acrylamide monomers, the cationic monomers and the optional diluter, functional and di-functional monomers and is initiated using known free radical initiators. Commonly used free radical initiators that can be used include the various peroxides, t-butyl hydroperoxide, cumene hydroperoxide, benxoyl peroxide, t-butoxyperoxy hexanoate and various azo-compounds such as azodiisobutyronitrile (AIBN), azodiisobutyramidine dihydrochloride (AIBA) and dimethylazodiisobutyrate. Other useful initiators are the water-soluble compounds such as hydrogen peroxide and the sodium, potassium and ammonium persulfates used by themselves or in activated redox systems.

As well understood by those skilled in the art, the amount of initiator should be sufficient to yield an acceptable reaction rate and, in combination with the level of monomeric reactants and the chain transfer agent, as hereinbelow described, a polyacrylamide adduct (reaction product) of a suitable molecular weight to be water soluble. The amount of initiator, however, should not be so high as to result in an uncontrolled rate of reaction and possible gel formation. The amount of initiator used in the solution polymerization will generally be in the range of 0.01 to 3% by weight, based on the weight of the monomers, and is usually between about 0.2 and 2% by weight. The initiator can be charged at the outset of the polymerization, however, incremental addition of the initiator throughout polymerization can also be employed and may be advantageous in some circumstances. Additional amounts of initiator (introduced by itself or associated with a reducer) are used at the end of the reaction in order to consume any residual un-reacted monomers.

The polymerization proceeds nicely at a temperature broadly in the range of 30 to 100° C., more usually in the range of 60 to 90° C.

In some cases it also may be desirable to conduct the reaction in the presence of an aliphatic alcohol, such as about 4 to about 15 percent by weight of an aqueous reaction mixture of ethanol, isopropyl alcohol, n-propanol or butanol.

Chain Transfer Agent

Another constituent of the reaction system is a chain transfer agent. As understood by those skilled in the art, the chain transfer agent functions to limit or control the molecular weight of the polymer formed by the free radical polymerization reaction taking place between the monomeric reactants. Thus, a chain transfer agent preferably is used in an amount sufficient to limit the molecular weight to a desired endpoint for the specific application. The amount of the chain transfer agent should not be so high, however, that it so severely limits the molecular weight of the resulting adduct that the polymer has a poor paper strengthening property. In order to accomplish these objectives, the chain transfer agent will generally be included in the reaction mixture in the range of about 0.1 to 30% by weight, based on the weight of the monomers, and most often will be used in an amount between about 0.5 and 15% by weight. The determination of a suitable level of chain transfer agent to use in any monomer system is a matter of routine experimentation to those of ordinary skill in the art.

The chain transfer agent usually is charged into the reaction mixture at the outset of the polymerization, though it too may be added later in the reaction or in increments if desired. Any material that is able to control/limit the extent of the polymerization via chain transfer can be used as the chain transfer agent. Suitable chain transfer agents include allyloxypropane diol, thioglycol, and mercaptans such as 2-mercaptoethanol, hydroxyethyl-3-mercaptopropionate and dodecylmercaptan. By using the chain transfer agent, one is able to limit the molecular weight of the polymerized product.

As understood by those skilled in the art, free radical solution polymerization reactions can be conducted by charging a reactor with appropriate amounts of the various monomers, the chain transfer agent, and the free radical initiator. An amount of water (and an optional water miscible solvent) also is included in the reactor to provide a final solids concentration in the aqueous composition within the range of about 5 to about 50 weight percent. The solids concentration of the aqueous reaction mixture more usually is on the order of 10 to 45 weight percent.

Molecular weights of suitable base polyacrylamide polymers before glyoxalation typically fall within the range of 500 to 1,000,000, more usually in the range of 1000 to 100,000. It is preferred that the base polymer be water-soluble before glyoxalation. For the most part, base polyacrylamide polymers having a molecular weight of less than about 25,000 and especially less than 10,000 are normally preferred. The molecular weight of the base polyacrylamide is influenced by changing the reaction temperature, the level of solids in the reaction, changing the amount of initiator, changing the amount of chain transfer agent, and other methods used by those skilled in the art.

Glyoxalation

The so-prepared polyacrylamide polymer then is at an alkaline pH in the range of 7.2 to 10.0. The pH can be controlled using a buffer system. A buffer of mono- and di-sodium phosphate is suitable, though other buffers would include any material that simultaneously functions as both a weak acid and a weak base and is able to maintain the desired pH such as: monopotassium phosphate plus borax, sodium hydroxide plus a mixture of acetic, phosphoric and boric acids, disodium phosphate plus citric acid.

Glyoxal (CHOCHO) reacts with pendant amide groups on the polyacrylamide backbone (1) according to the following reaction to produce a polyacrylamide having a pendant group (2):

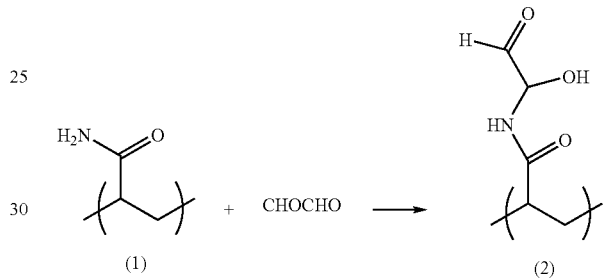

A second reaction involves the so-formed aldehyde moiety on the polymer backbone with another amide group, such as belonging to another macromolecule, and leads to building molecular weight and cross-linking.

To initiate the glyoxalation of the polyacrylamide, an amount of glyoxal to provide between about 10 to 60 mole percent glyoxal, based on the molar concentration of pendant amide groups and other optional glyoxal-reactive functional groups in the polyacrylamide, is added as the first of at least two separate portions to the polyacrylamide. Stated in another way, 1 to 6 glyoxals are supplied for every 10 pendant amide groups and other optional glyoxal-reactive functional groups in the polyacrylamide.

The glyoxalation of the cationic polyacrylamide usually is performed at a temperature of about 15° C. to about 50° C. and in an aqueous solution at a total solids concentration ranging from about 8 weight % to about 30 weight %.

The first portion of glyoxal is added to the polyacrylamide polymer in water to cause glyoxalation and some cross-linking between pendant amide and other glyoxal-reactive functional groups in the polyacrylamide. Such cross-linking increases the molecular weight of the composition. The molecular weight is preferably increased sufficiently so as to obtain a desired viscosity in the range of about 30 to about 80 cPs at 25° C. for a 20 weight % solids solution. Those skilled in the art will appreciate a suitable extent of crosslinking to obtain such a result.

Acid Quenching

As a desired viscosity is attained, the rate of the glyoxalation reactions and related cross-linking reactions can be slowed and eventually substantially terminated by acid quenching.

For better control of the glyoxalation reactions, a two step quenching procedure can be used. For example, the glyoxalation can start at a pH at the higher end of the pH range suitable for the glyoxalation reaction in order to obtain a higher reaction rate. In order to control the reaction rate, at a certain extent of conversion short of the desired end-point, the pH then is reduced by adding an acid to the reaction mixture (first acid quench to $7.0 \leq pH \leq 7.4$). The reaction then continues at a reduced rate. After a final desired viscosity is reached, a second acid quench is used to reduce the pH further ($3 \leq pH \leq 3.5$) and to substantially terminate the glyoxalation reactions.

It is preferred that the pH of the aqueous reaction system be adjusted to the range of 3 to 5 through addition of an acid. The acid added to the polyacrylamide can be either a mineral acid (such as hydrochloric acid, sulfuric acid, phosphoric acid and the like) or an organic acid like formic acid, acetic acid, citric acid, malic acid, lactic acid and the like.

A procedure for determining the amount of bound glyoxal in the polymer is described in Analytical Biochemistry, Vol. 81, pp. 47-56 (1977), which is incorporated by reference herein. Additional details on suitable reaction conditions for binding glyoxal to the primary vinylamide also are described in U.S. Pat. No. 3,556,932, which is also incorporated by reference.

Glyoxal Post-Addition

Following the acid quench, an optional second portion of glyoxal is then preferably added to the composition to enhance its stability. The amount of glyoxal added in the second portion is about 1% to about 75% by weight of the first portion of glyoxal, more usually between about 4 and about 50 weight percent. By increasing the amount of free-glyoxal in the composition at this point, an equilibrium is established that reduces the tendency of the composition to undergo further cross-linking before use, e.g., on shipping and storage. The polyacrylamide composition thus exhibits an improved stability because of the glyoxal post-addition.

The stability enhancement produced by the two-step glyoxal addition cannot be obtained simply by adding a higher amount of glyoxal in the first portion. The kinetics of the glyoxalation reactions, in the presence of a higher initial amount of glyoxal, precludes the obtainment of a proper balance between molecular weight (extent of cross-linking) and residual free glyoxal that results in the higher level of stability observed for the present composition.

Buffers

Further stability enhancement of the polyacrylamide composition is obtained by adding to the polyacrylamide composition a buffer that regulates (stabilizes) the pH of the polyacrylamide composition between about 3 and 3.5. One suitable buffer is a mixture of 20 parts by volume of a 0.2 M sodium hydroxide with 100 parts by volume of a stock solution containing 0.4 M acetic acid, 0.4 M phosphoric acid, and 0.4 M boric acid. This buffer is used in the following examples and has been shown to keep the pH of the polyacrylamide composition relatively constant over a period of at least six weeks.

Other buffers that could be used include materials that simultaneously function as both a weak acid and a weak base, such as citric acid with sodium citrate, disodium phosphate with citric acid, succinic acid with borax, acetic acid with sodium acetate, monopotassium phthalate with hydrochloric acid, bicarbonates, carbonate esters, complex carbonate salts of organic acids, hydrogen phosphates, phosphate esters, phosphinate esters, borates, borate esters, hydrogen sulfates, sulfinates, and sulfate esters.

Other examples of suitable buffers include potassium bicarbonate, potassium biphthalate, potassium bisulfate, potassium dihydrogen citrate, dipotassium hydrogen citrate, potassium dihydrogen phosphate, dipotassium hydrogen phosphate, potassium hydrogen tartrate, potassium hydrogen oxalate, potassium hydrogen maleate, potassium hydrogen succinate, potassium hydrogen glutarate, potassium hydrogen adipate, potassium tetraborate, potassium pentaborate, potassium octaborate and all the corresponding sodium salts, complex calcium carbonate salts of organic acids (such as octanoic acid, iso-octanoic acid, 2-ethyl hexanoic acid, hexanoic acid, and the like) and other similar materials known in the art.

Further Stabilization Using an Aldehyde Scavenger

Yet another improvement to the stability of the composition is garnered by adding one or more aldehyde scavengers to the polyacrylamide or at one or more of its preparation steps. The stability of the polyacrylamide depends upon a balance between the free glyoxal in the composition and the reactive pendant aldehyde and other functional groups. In order to reduce the reactivity of the aldehyde and other functional groups, a mono-functional aldehyde scavenger material preferably of a low volatility (high boiling point) is used.

Compounds with a single hydroxyl group such as lactic acid, malic acid, citric acid, choline chloride and the like can be used. Such aldehyde scavengers are present in an amount of about 0.0001 to 0.25 mole per mole of glyoxal added in both the first and second portions (the total glyoxal amount), preferably in an amount of 0.01 to about 0.15 mole per mole of total glyoxal, in preparing the polyacrylamide composition. In the presence of such a scavenger, the pH tends to remain constant and the shelf-life of the composition tends to be increased further. The longer storage life of the stabilized product allows the polyacrylamide composition to be stored at a higher concentration (no dilution is required) and the only dilution that needs to be taken into account is at the wet end of the paper process.

Preferred Aldehyde Scavengers

Preferred aldehyde scavengers are adducts of choline or a choline salt and an acrylamide monomer and have the structure shown below:

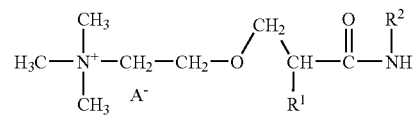

The "acrylamide monomer" is a monomer of a primary vinylamide, including not only acrylamide itself but also substituted acrylamides having the formula:

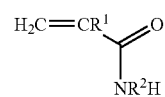

wherein $R^1$ is hydrogen or $C_1$-$C_2$ alkyl and $R^2$ is hydrogen or $C_1$-$C_4$ alkyl.

"$A^-$" is a compatible anion such as hydroxyl or any negatively charged ion which can form a salt with choline (e.g., chloride).

Preferred aldehyde scavengers are much more efficient than scavengers which contain a hydroxyl group. In addition, preferred aldehyde scavengers can provide supplementary cationic charges for the polymer backbone because any reaction between an aldehyde pendant group and the adduct will result in an additional cationic charge on an acrylamide polymer or copolymer.

An adduct of choline chloride and acrylamide (ethanaminium, 2-(3-amino-3-oxopropyl)-N,N,N-trimethyl-, chloride) is a particularly preferred aldehyde scavenger:

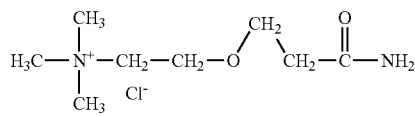

Preparation of Preferred Aldehyde Scavengers

Preferred aldehyde scavengers are prepared by reacting choline or a choline salt with an acrylamide monomer, as shown below:

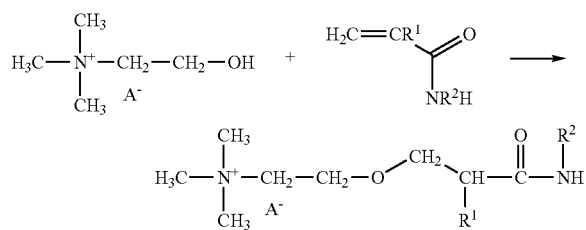

Preferred aldehyde scavengers can be prepared, for example, through a Michael addition reaction. The Michael addition can be performed in an aqueous solution containing about 2.5% by weight sodium hydroxide at a temperature in the range of 70° to 100° C. The molar ratio between the choline or choline salt and the acrylamide monomer can be in the range of 1:1 to 1:0.5 with the solids content of the reactants between about 25 to 70 wt. %. In such reactions, the acrylamide conversion to aldehyde scavenger is higher than 95% (based on free acrylamide concentration measurements). The resultant preparation can be used without further purification.

Addition of Aldehyde Scavengers

One or more aldehyde scavengers, including preferred aldehyde scavengers, can be added to a polyacrylamide composition and/or during one or more steps in the preparation of a polyacrylamide composition. Preferred aldehyde scavengers also can be added during polymerization of the base polyacrylamide. The longer storage life of the resultant stabilized product allows the polyacrylamide composition to be stored at a higher concentration (no dilution is required), and the only dilution that needs to be taken into account is at the wet end of the paper process. Thus, shipping and storage costs associated with such stabilized compositions are generally lower than with prior art compositions.

Addition of a Preferred Aldehyde Scavenger During Polymerization of the Base Polyacrylamide Not all acrylamide monomers form an adduct between the choline or choline salt during preparation of an aldehyde scavenger. Unless further purified, a preparation of aldehyde scavenger will contain free acrylamide monomers. If such a preparation is present during polymerization of a base polyacrylamide, the free acrylamide monomers will be incorporated into the base polyacrylamide, and the aldehyde scavenger will already be present when glyoxalation of the base polyacrylamide begins; presence of the aldehyde scavenger at that point can increase the density of positive charges on the polyacrylamide, as described below.

If added during polymerization of a base polyacrylamide, the preferred aldehyde scavenger typically is present in an amount ranging from about 0.7 mole to about 1.5 mole percent based upon total acrylamide monomer.

Addition of a Preferred Aldehyde Scavenger During and at the Beginning of Glyoxalation Some wet strength arises from cationic charges binding with anionic sites on cellulose. If this binding is disrupted, the polymer chain will be free and unable to impart wet strength to paper. Adding one or more preferred aldehyde scavengers at the beginning of glyoxalation increases the number of cationic charges on the polyacrylamide backbone, thereby increasing the ability of the polyacrylamide to impart wet strength to paper.

During glyoxalation, free (un-reacted) glyoxal is in equilibrium with pendant amide groups on the base polyacrylamide. If a preferred aldehyde scavenger is present, free preferred aldehyde scavenger is in equilibrium with adducts between the scavenger and pendant amide groups on the base polyacrylamide. The free preferred aldehyde scavenger slows down the reaction between un-glyoxalated pendant amide groups and free glyoxal. These embodiments of the invention provide a copolymer with cationic charges as pendant groups which are bonded to the backbone through breakable bonds. Thus, a polyacrylamide composition having a higher positive charge density is obtained than if the preferred aldehyde scavenger had not been present. Such compositions have a greater affinity for cellulose fibers than compositions prepared using other, non-charged scavengers.

Because the preferred aldehyde scavenger provides cationic charges to the polyacrylamide in these embodiments, the base polyacrylamide need not be polymerized with cationic co-monomers. Thus, the base polyacrylamide can be a polyacrylamide homopolymer or can be a copolymer with a cationic co-monomer but at a lower concentration of cationic co-monomer than described above.

If added at the beginning of glyoxalation, a preferred aldehyde scavenger preferably is present in an amount ranging from about 0.7 to about 1.5 mole for each mole of total glyoxal.

If desired, one or more preferred aldehyde scavengers can be included at any point during glyoxalation (i.e., before the acid quench). The resultant product has a longer shelf life. In addition, the endpoint of the glyoxalation reaction can be better controlled.

If added during the glyoxalation reaction, a preferred aldehyde scavenger preferably is present in an amount ranging from about 0.1 to about 0.5 mole for each mole of total glyoxal.

Addition of Preferred Aldehyde Scavengers After Glyoxalation

A preferred aldehyde scavenger can be added after initial glyoxalation (i.e., during or after the acid quench). Addition of an aldehyde scavenger after glyoxalation also results in a longer shelf life for the final stabilized polyacrylamide composition.

If added during the acid quench, a preferred aldehyde scavenger preferably is present in an amount ranging from about 0.01 to about 0.15 mole for each mole of total glyoxal. If added after the acid quench, a preferred aldehyde scavenger preferably is present in an amount ranging from about 0.01 to about 0.3 mole for each mole of glyoxal.

Addition to Glyoxalated Polyacrylamide Compositions (e.g., "Post-Glyoxal Addition")

The pH tends to remain constant and the shelf-life of the composition tends to be increased further in the presence of aldehyde scavengers, including preferred aldehyde scavengers. The polyacrylamide compositions can be prepared as described above or by any other means of preparing polyacrylamides known in the art.

As described above, stabilized polyacrylamides can be prepared by adding a second portion of glyoxal after the acid quench. Aldehyde scavengers, particularly preferred aldehyde scavengers, also provide enhanced stability to these stabilized polyacrylamides. For example, the shelf life for a stabilized polyacrylamide prepared as described above but without any scavenger is about 20 days at room temperature. When citric acid, a known aldehyde scavenger, was added after glyoxal post-addition, the shelf life increased to about 40 days at room temperature. When a preferred aldehyde scavenger (ethanaminium, 2-(3-amino-3-oxopropyl)-N,N,N-trimethyl-, chloride) was added after glyoxal post-addition, the polyacrylamide increased to about 60 days at room temperature. Significant improvements in both initial wet strength and decay rate were obtained using this scavenger.

If added to a polyacrylamide composition, a preferred aldehyde scavenger preferably is present in an amount ranging from about 0.01 to about 0.3 mole for each mole of glyoxal.

Polymeric Paper Strengthening Agent

Compositions of the invention also include one or more polymeric paper strengthening agents, preferably wet strengthening agents, blended with the stabilized polyacrylamide. The polymeric paper strengthening agent can be a cationic polymer, an anionic polymer, or a neutral polymer; it can be a homopolymer or a copolymer; and it can be water soluble or water dispersible. The polymeric paper strengthening agent can be, for example, another temporary or a permanent wet strengthening agent. Permanent-type wet strengthening agents are preferred.

Numerous cationic paper strengthening agents are known in the art and include dialdehyde starch, polyethylemeimine, mannogalactan gum, and dialdehyde mannogalactan. See, e.g., U.S. Pat. No. 5,427,652. Preferred cationic polymeric paper strengthening agents used in compositions of the invention include thermosetting cationic polyamine or polyamide wet-strength resins which are commonly used in papermaking. Most of these resins are reaction products of polyamines and polyamides with halohydrins, such as epichlorohydrin. Illustrative examples of the polyamine, cationic wet-strength resins are those described in U.S. Pat. Nos. 2,926,154; 2,969,302; 3,248,353; 3,269,852; 3,224,990; 3,248,280; 3,372,086; 3,556,932; 4,217,425; 4,603,176; 4,605,702; 4,853,431; 5,427,652; 5,466,377; 5,567,798; 5,674,362; 5,723,022; 5,783,041; 6,077,394; 6,429,253; and RE 26,018.

Preferred cationic polymers include, but are not limited to, poly(diallyl dimethyl ammonium chloride) (polyDADMAC), polyamidoamine (prepolymer), polyamidoamine-Epi (AMRES®), DADMAC copolymers, cationic styrene maleic anhydride (SMA), cationic latexes, and mixtures thereof. Particle cores for cationic latexes can be made by polymerization or copolymerization of any hydrophobic monomer (e.g., styrene, butyl acrylate or any other acrylic ester, methyl methacrylate or any other methacrylic ester, etc.). Cationic latexes can be stabilized by a cationic emulsifier or can be "self-stabilized" (if a cationic monomer is involved in the free-emulsifier emulsion copolymerization).

Preferred anionic polymers include acrylamide-acrylic acid copolymers, styrene acrylic acid copolymers, styrene maleic anhydride copolymers, styrene-acrylic acid—hydroxyethyl acrylate copolymers, carboxymethylcellulose (CMC), anionic latex, and mixtures thereof.

Neutral polymers include polyvinyl alcohol, starch, polyhydroxyethyl acrylate, and mixtures thereof.

In order to maximize the initial wet strengthening ability of the polyacrylamide compositions of the present invention, it also may be desirable to increase the concentration of aldehyde pendent groups. In order to accomplish this goal, applicants have identified certain acrylamide-amine adducts (hereinafter referred to as "polyacrylamide-adducts") that can be added either to the initial reaction mixture or as another component of the acrylamide monomer mixture in the synthesis of the polyacrylamide composition. The polyacrylamide-adduct can be obtained "in situ" between acrylamide in excess and polyamine before the free radical polymerization and then the excess of acrylamide is copolymerized in the presence of that adduct. Alternatively, these adducts can be added, after the polyacrylamide synthesis, to the cationic polyacrylamide composition before the glyoxalation reaction is conducted. In yet another embodiment, these adducts can be used as a glyoxal scavenger after the glyoxalation has been conducted.

These polyacrylamide-adducts are prepare by reacting an amine, such as ammonia, ethylene diamine, diethylene triamne (DETA), triethylene tetraamine (TETA), a polyamidoamine, or a polyvinylamine with an acrylamide monomer. Suitable acrylamide monomers would include acrylamide, methacrylamide, N-alkyl acrylamide and N-alkyl methacrylamide to name a few.

The reaction proceeds in water at room temperature and is accompanied by a strong exotherm. The adduct forms as a Michael Addition product between the active hydrogen of the amine and the double bond of the acrylamide monomer, the tertiary amine product itself acting as a catalyst to promote the Michael Addition reactions.

The molar ratio of the acrylamide (acrylamide double bond(s)) to the active hydrogens of the amine broadly may be between about 0.1 and 2.0, and more often is between about 0.5 and 1.5. At a molar ratio below 1, there generally are secondary amine hydrogens (active hydrogens) left for further reaction. At molar ratios above 1, there is excess acrylamide in the composition that could be available for free radical polymerization in the synthesis of the polyacrylamide composition. Often, such adducts are prepared at a mole ratio of acrylamide to active amine hydrogens of greater than about 1.

Using DETA and acrylamide in a 1:5 mole ratio of amine to acrylamide (a 1:1 mole ratio of acrylamide to amine active hydrogens), one obtains the following idealized structure (I) for the polyacrylamide-adduct:

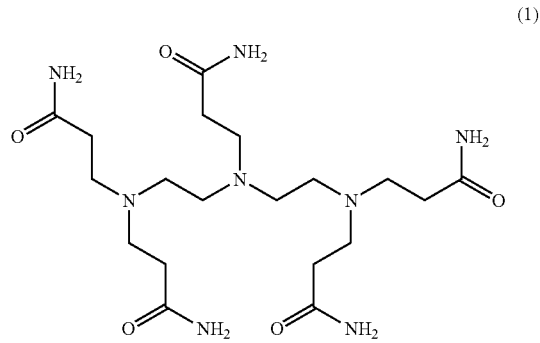

(1)

Suitable amines for preparing the polyacrylamide adducts include ammonia, ethylene diamine, diethylene triamne (DETA), triethylene tetraamine (TETA), low molecular weight polyamidoamines, polyvinylamines, polyethyleneimine and copolymers of vinyl amine with other unsaturated co-polymerizable monomers such as vinyl acetate and vinyl alcohol to name a few. Suitable polyamidoamines are generally prepared by reacting a dicarboxylic acid (diacid), (or a corresponding dicarboxylic acid halide, or diester thereof) with a polyalkylene polyamine. For example, suitable polyamidoamines can be made by reacting suitable polyalkylene polyamines, such as polyethylenepolyamines including diethylenetriamine, triethylenetetramine, aminoethyl piperazine, tetraethylenepentamine, pentaethylenehexamine, N-(2-aminoethyl)piperazine, N,N-bis(2-aminoethyl)-ethylenediamine, diaminoethyl triaminoethylamine, piperazinethyl triethylenetetramine, and the like, with polycarboxylic acids such as succinic, glutaric, 2-methylsuccinic, adipic, pimelic, suberic, azelaic, sebacic, undecanedioic, dodecandioic, 2-methylglutaric, 3,3-dimethylglutaric and tricarboxypentanes such as 4-carboxypimelic; alicyclic saturated acids such as 1,2-cyclohexanedicarboxylic, 1-3-cyclohexanedicarboxylic, 1,4-cyclohexanedicarboxylic and 1-3-cyclopentanedicarboxylic; unsaturated aliphatic acids such as maleic, fumaric, itaconic, citraconic, mesaconic, aconitic and hexane-3-diotic; unsaturated alicyclic acids such as Δ4-cyclohexenedicarboxylic; aromatic acids such as phthalic, isophtalic, terephthalic, 2,3-naphthalenedicarboxylic, benzene-1,4-diacetic, and heteroaliphatic acids such as diglycolic, thiodiglycolic, dithiodiglycolic, iminodiacetic and methyliminodiacetic. Usually, diacids and their related diesters of the formula $RO_2C(CH_2)_nCO_2R$ (where n=1-10 and R=H, methyl or ethyl) and mixtures thereof are preferred. Adipic acid is readily available and is most often used.

Several classes of polyacrylamide-adducts prepared by reaction between an amine, especially a polyamine, a polyamidoamine, polyethyleneimine or a polyvinyl amine, and an acrylamide monomer as described above can be represented by the following formulae (II)-(V): These formulae represent only a small number of the kinds of polyacrylamide-adducts contemplated by the present invention, limited only by the nature of the amine, preferably a polyamine, reacted with the complement acrylamide monomer(s).

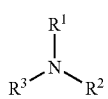
(II)

Wherein $R^1$, $R^2$, and $R^3$ are independently selected from hydrogen and the residue of an acrylamide monomer (resulting from a Michael Addition reaction between an acrylamide monomer and an active hydrogen of the amine, i.e., (—RC(O)NHR') where R and R' independently are a linear or branched $C_1$ to $C_6$ alkyl, which are optionally substituted, and wherein at least one of $R^1$, $R^2$, and $R^3$ is the residue of an acrylamide monomer. Suitable polyacrylamide adducts of formula II will have a molecular weight between about 200 and 350.

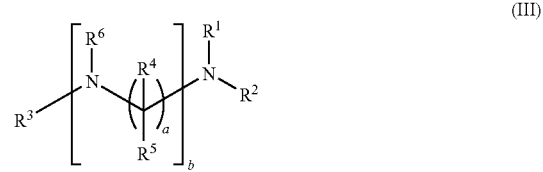
(III)

Wherein $R^1$, $R^2$, $R^6$ and $R^3$ are independently selected from hydrogen and the residue of an acrylamide monomer (resulting from a Michael Addition reaction between an acrylamide monomer and an active hydrogen of the amine, i.e., (—RC(O)NHR') where R and R' independently are a linear or branched $C_1$ to $C_6$ alkyl, which are optionally substituted, and wherein at least one of $R^1$, $R^2$, $R^6$ and $R^3$ is the residue of an acrylamide monomer; $R^4$ and $R^5$ are independently selected from hydrogen and a $C_1$ to $C_4$ alkyl; a is an integer independently selected from 1, 2 or 3 and b is an integer reflecting the number of repeating N-alkylene units (indicative of the molecular weight) of the polyacrylamide-adduct. Suitable polyacrylamide adducts of formula III will have a molecular weight between about 300 and 800.

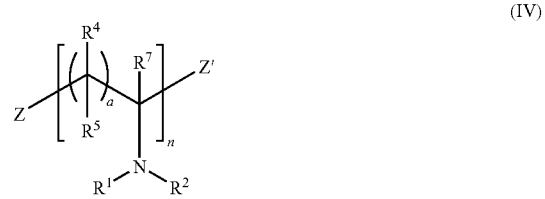
(IV)

Wherein $R^1$ and $R^2$ are independently selected from hydrogen and the residue of an acrylamide monomer (resulting from a Michael Addition reaction between an acrylamide monomer and an active hydrogen of the amine, i.e., (—RC(O)NHR'), R and R' independently are a linear or branched $C_1$ to $C_6$ alkyl, which are optionally substituted, and wherein at least one of $R^1$ and $R^2$ is the residue of an acrylamide monomer; $R^4$, $R^5$ and $R^7$ are independently selected from hydrogen and a $C_1$ to $C_4$ alkyl; a is an integer independently selected from 1, 2 or 3, n is an integer reflecting the number of repeating vinyl amine units (indicative of the molecular weight of the polyacrylamide-adduct) and Z and Z' independently can be the repeating unit(s) of another vinyl-type monomer such as vinyl acetate or vinyl alcohol, or can be hydrogen, or a linear or branched $C_1$ to $C_6$ alkyl. Suitable polyacrylamide adducts of formula IV will have a molecular weight between about 200 and 2000.

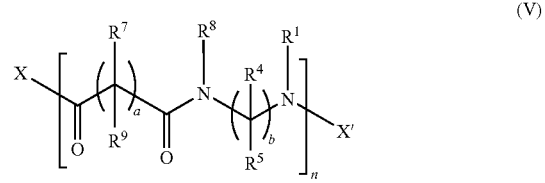
(V)

Wherein $R^1$ and $R^8$ are independently selected from hydrogen and the residue of an acrylamide monomer (resulting from a Michael Addition reaction between an acrylamide monomer and an active hydrogen of the amine, i.e., (—RC (O)NHR'), R and R' independently are a linear or branched $C_1$ to $C_6$ alkyl, which are optionally substituted, and wherein at least one of $R^1$ and $R^8$ is the residue of an acrylamide monomer; a and b are integers independently selected from 1, 2 or 3; $R^4$, $R^5$, $R^7$ and $R^9$ are independently selected from hydrogen or a $C_1$ to $C_4$ alkyl; n is an integer reflecting the number of repeating amidoamine units (indicative of the molecular weight) and X and X' independently can be the residue of the diacid (—OH, OR, or OMe, where Me is a salt-forming metal ion), the residue of the diamine (—H) used to prepare the polyamidoamine, the residue of an acrylamide monomer (reacting with the active hydrogen of the diamine residue, or it can be another known polyamidoamine terminus. Formula (V) constitutes a class of polyacrylamide-adducts made from well-known class of polyamidoamines that are made from polyalkylene polyamines and aliphatic diacids. Suitable polyacrylamide adducts of formula IV will have a molecular weight between about 200 and 6000.

For even higher molecular weight adducts, the polyacrylamide-adducts of formulae (I) through (V) can be joined or linked together using a bi-functional reactant such as methylene bis-acrylamide. In the case of the polyacrylamide-adduct(s) of formula (I), the resulting product made by linking the adducts with methylene bis-acrylamide may have the following structure:

polyacrylamide composition. When used for this purpose, the adduct should be essentially free of unreacted acrylamide monomer.

Preparation and Use of Paper Strengthening Compositions

Compositions of the invention typically are made by mixing one or more polymeric paper strengthening agent(s) and the stabilized polyacrylamide at about 20-35° C. for from about 1 to about 30 minutes. For some applications, such as for use with repulpable paper, it may be advantageous to form a composition of the invention 1, 2, or several days before using the composition to strengthen paper. The concentration of the stabilized polyacrylamide is within the range of about 40-99% of the combined weight of the polymeric paper strengthening agent(s) and the stabilized polyacrylamide by weight, based on solids. The ratio of the stabilized polyacrylamide and the polymeric paper strengthening agent(s) can be varied to obtain compositions with different final solids concentrations, viscosities, charge densities. A preferred aldehyde scavenger can be used to vary the number of available reactive aldehyde groups and to vary the charge density of the stabilized polyacrylamide. Such adjustments are within the skill of those in the art.

Compositions of the invention are readily employed in the manufacture of paper as aqueous solutions and dispersions.

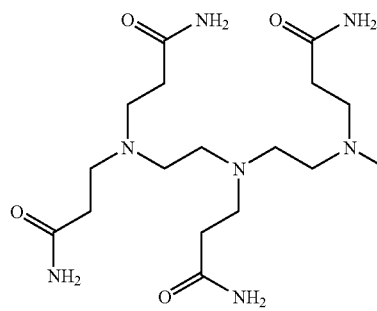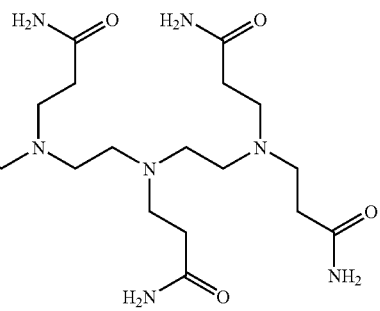

The polyacrylamide-adducts of the present invention also can be quaternized to give the adducts a cationic character before they are used in accordance with the present invention. For example, epichlorohydrin can be reacted with residual secondary amines in the polyacrylamide-adducts to make a quaternary ammonium salt or an azetidinium cation (see formula (VII) below). Such residual secondary amines also could be functionalized with dimethyl sulfate.

(VII)

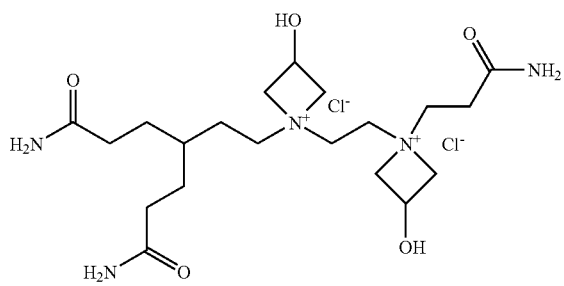

As noted earlier, the polyacrylamide-adducts described above also can be used as a glyoxal scavenger in the final Generally, a composition of the invention used as a paper strengthening agent will have a solids concentration between about 5 and 25 weight percent. The compositions are not limited to treating any particular type of paper and should find application in Kraft paper, sulfite paper, semichemical paper, and the like, including paper produced using both bleached and unbleached pulps. Compositions of the present invention are extremely effective for developing wet strength in facial tissue, napkins, towels, carrierboard, liquid packaging, bag paper, linerboard medium and other specialty papers.

When using a composition of this invention in papermaking, it can be added at any time before, during or after the paper is formed. The composition is conveniently added at the wet end of a paper-making facility to the dilute cellulose fiber suspensions, normally at a point when wet strength resins are conventionally added. Alternatively, a composition of the present invention can be added to a previously prepared paper by padding, spraying, immersing, printing and the like.

Compositions of this invention can be added to paper pulp over a wide range of pH values. However, best results are obtained by adding the composition to the paper pulp at a pH of from about 4.5 to about 8.0, most preferably from about 4.5 to about 7.0. Compositions of the present invention are readily absorbed by the cellulose fibers at these pH values.

The amount of a composition of this invention added can be as low as about 0.05% of the dry weight of the cellulose fibers, but usually does not exceed about 0.5% by weight. An amount in the range of 0.2% to 0.4% of the dry paper weight is more usual.

All patents, patent applications, and references cited in this disclosure are expressly incorporated herein by reference. The above disclosure generally describes the present invention. A more complete understanding can be obtained by reference to the following specific examples, which are provided for purposes of illustration only and are not intended to limit the scope of the invention.

Example 1

A Polyamidoamine-Epi Polymer

To a reaction vessel equipped with an agitator and a reflux condenser was added 218 g of diethylenetriamine. To this was added slowly over 45 minutes 318 grams of solid adipic acid. As the adipic acid was added the reaction temperature climbed steadily from ambient to 140 C, at which point the temperature remained constant. Upon completion of the adipic acid addition, the reaction mixture was then heated to 155° C., at which point reflux began. The reflux condenser was reconfigured for distillation, and water was distilled from the reactor into a collection vessel. During the distillation, the reaction temperature was slowly ramped up to a maximum of 165° C. Distillation was continued at 165° C. until a sample of the reaction mixture, removed from the reactor and diluted to 45% solids, reached a Gardner-Holdt viscosity of L. The distillation condenser was reconfigured for reflux and 350 grams of water was added slowly through the reflux condenser, to carefully reduce the reaction temperature to approximately 95° C. while diluting the reaction mixture. Additional water was then added to adjust the reaction mixture to 45% total solids. The resulting polyamidoamine solution had a Brookfield viscosity of 300 cP at 45% solids.

To 359 gram of the above polyamidoamine solution was added about 25 gram of water. Then, 92 gram of epichlorohydrin was gradually added within 75 minutes under vigorous agitation. The mixture temperature was controlled below 25° C. while epichlorohydrin was being added. As the addition of epichlorohydrin was complete, the mixture then was heated to 30° C. and was maintained at the same temperature for 30 minutes. Then 387 gram of water to the mixture was added and heated to about 60° C. When the Gardner-Holdt viscosity of the mixture increased to B, the reaction mixture was cooled to 55° C. in order to slow down the reaction rate. The reaction continuously advanced to the Gardner-Holdt viscosity of EF, then was cooled to 50° C. The reaction mixture was maintained at 50° C. until it had obtained a viscosity of KL. To the resulting solution was added about 29.3 gram of an acid mixture containing formic acid and sulfuric acid in a blend ratio of 1.19 to 1 and having an acid concentration of 52% by weight. As above, the dilution water of 125 gram was added to achieve the target RI of 1.3826. The final aqueous polyamidoamine-epichlorohydrin resin resulting solution was obtained by adjusting resin pH to 2.85 using the blend of sulfuric and formic acids. The final resin has a solids concentration of 25.04 wt. %, cationic charge of 2.09 meq/gram, a pH of 3.0 and a viscosity of 172 cPs at 25° C.

Resin viscosity measurement refer to GP Analytical Method 2187.5 (Described Herein)

Resin cationic charge measurement refer to GP Analytical Method 2610.2 (Described Herein)

Example 2

Glyoxalated Polyacrylamide Resin

A suitable 2 liter glass reactor was fitted with a stirring apparatus, thermometer, a nitrogen inlet, a condenser and then placed in heating bath. The reactor was charged with 400 g water, 125 g DADMAC solution (63% concentration), 120 g acrylamide solution (50% concentration), 9 g 2-hydroxyethyl acrylate, 19 g solution of a polyacrylamide-adduct (the adduct of Formula I obtained by reacting 355 g acrylamide 50% solution –2.5 moles—with 51.5 g DETA—0.5 moles—for 30 minutes at 75° C.), having a concentration 56% by weight) and 7 g 2-mercaptoethanol. The reactor was then heated to 80° C. at which time the acrylamide monomer feed (680 g acrylamide (50% concentration), 51 g hydroxyethyl acrylate, 110 g solution of the polyacrylamide-adduct and 41 g 2-mercaptoethanol) and the initiator solution feed (3.2 g ammonium persulfate in 120 g water) were initiated and continuously added to the reactor. The initiator solution flow rate is constant over a total addition time of 190 minutes. The acrylamide monomer solution is added initially at a slow flow rate (282 g in the first 120 minutes) and then at a much higher flow rate (600 g in 60 minutes). The total addition time for the acrylamide monomer solution is 180 minutes. After the addition of the initiator solution was completed, the temperature was maintained at 80° C. for an additional 30 minutes. To lower the concentration of any un-reacted acrylamide, t-butyl hydroperoxide (0.7 g solution 70%) and sodium formaldehyde sulfoxylate (0.3 g) were added. The final solution has a solids concentration of 40.7%, a pH of 3.3, a viscosity of 18.9 cPs at 25° C. and a charge density of 0.193 meq/gram.

To 206.6 gram of the above the polyacrylamide solution was added about 27.1 gram of water in a 1 liter glass reactor equipped with condenser, stirrer and a jacketed connection to a circulated constant temperature water bath. Then 43.5 g of a 40% weight glyoxal aqueous solution and 41.1 g of a sodium phosphate buffer solution (pH 8.0, 7.3% by weight concentration) were added. The temperature was set to 30° C. The pH was adjusted to 8.0 by the addition of 49.5 g of a 4% by weight sodium hydroxide solution. The pH of the solution was maintained at 8.0 by continuously adding 0.3% by weight sodium hydroxide solution. As soon as the Brookfield viscosity of the reaction solution reached about 20 cPs, the 0.3% sodium hydroxide addition was discontinued. This process consumed about 120 g of 0.3% NaOH solution. Then, the pH was lowered to 7.2 by adding 1.7 g of a 35% weight sulfuric acid aqueous solution to slow the rate of the glyoxalation reactions. When the polymer reaction solution reached a Brookfield viscosity of about 58 cPs, the pH was lowered to 3.3 with 8.2 g of a 35% weight sulfuric acid solution to quench the glyoxalation reactions. A sodium citrate buffer solution (pH 3.3, 15.0% by weight concentration) was added in an amount of 58.4 g. Then, 2.1 g of a 40% glyoxal solution was post-added. The final solids content was 21.4% by weight. Dilution water was added to adjust the final solids to 20% by weight. The resulting resin has a cationic charge density of 0.56 meq/gm, a solids concentration of 19.96 wt. %, a pH of 3.35, and a viscosity of 25.2 cPs at 25.degree. C.

Example 3

Composition with 10% of Glyoxalated Polyacrylamide Resin and 90% PAE Resin

A suitable 1 liter glass beaker was fitted with stirring apparatus. The beaker was charged with 718.6 g of the polyamidoamine-epichlorohydrin (PAE) resin of Example 1 and 100.2 g of the polyacrylamide resin of Example 2. After the addition of the two components, the stirring apparatus turned on immediately. Initial viscosity of mixture was 156 cPs. The mixture temperature did not need to control, just maintained at the room temperature of around 25° C. The two components were maintained to mix at the speed rate of 500 RPM for 30 minutes, resulting in a viscosity increased product. The final mixed product is cationic and water-soluble, has a solids concentration of 24.43 wt. %, cationic charge of 1.89 meq/gram, a pH of 3.0 and a viscosity of 192 cPs at 25° C.

Example 4

Composition with 20% of Glyoxalated Polyacrylamide Resin and 80% PAE Resin

A suitable 1 liter glass beaker was fitted with stirring apparatus. The beaker was charged with 638.7 of polyamidoamine-epichlorohydrin resin of Example 1 and 200.4 g of the polyacrylamide resin of Example 2. After the addition of the two components, the stirring apparatus turned on immediately. Initial viscosity of mixture was 134 cPs. The mixture temperature did not need to control, just maintained at the room temperature of around 25° C. The two components were maintained to mix at the speed rate of 500 RPM for 30 minutes, resulting in a viscosity increased product. The final mixed product is cationic and water-soluble, has a solids concentration of 23.84 wt. %, cationic charge of 1.75 meq/gram, a pH of 3.0 and a viscosity of 206 cPs at 25° C.

Example 5

Composition with 30% of Glyoxalated Polyacrylamide Resin and 70% PAE Resin

A suitable 1 liter glass beaker was fitted with stirring apparatus. The beaker was charged with 558.9 of polyamidoamine-epichlorohydrin resin of Example 1 and 300.6 g of the polyacrylamide resin of Example 2. After the addition of the two components, the stirring apparatus turned on immediately. Initial viscosity of mixture was 123 cPs. The mixture temperature did not need to control, just maintained at the room temperature of around 25° C. The two components were maintained to mix at the speed rate of 500 RPM for 30 minutes, resulting in a viscosity increased product. The final mixed product is cationic and water-soluble, has a solids concentration of 23.27 wt. %, cationic charge of 1.61 meq/gram, a pH of 3.1 and a viscosity of 224 cPs at 25° C.

Example 6

Procedure for Evaluation of Compositions for Paper Towel Grades

Preparation of Handsheets

The pulp stock used in the handsheet work was composed of 60% Boise Cascade, 27% Eucalyptus, 13% Miller Western; 30% Recycle Fiber (obtained from a commercial tissue paper machine). The stock freeness was in the range of 580 CSF to 600 CSF. The stock pH was 7.1 through the process. The composition resins were added at 16 lb/ton of pulp solids to a 0.3% consistency diluted stock allowing a 2-minute mixing time. The treated stock was immediately poured into the headbox of the Noble & Wood handsheet machine containing pH pre-adjusted water (pH of 7.0). The target sheet basis weight was 30 lb/3000 ft$^2$. Each wet sheet was given two passes through the full load wet press, and then placed on the 105° C. drum dryer without the blotter for 1 minute. All sets of handsheets were further cured for 3 minutes at 105° C. in a forced air oven. The handsheet samples were continued at a constant humidity (50%) and at a constant temperature (73° F.) for 24 hours prior to testing. Dry tensile and wet tensile (test specimens immersed in distilled water at 23.0±2° C. under the vacuum level of 21 inch Hg for 3 minutes for saturation) were tested to measure improved paper dry and wet tensile strength performance.

Dry tensile measurement method refers to TAPPI Test Method T494 om-01 (Effective Date Sep. 5, 2001).

Wet tensile measurement method refer to TAPPI Test Method T456 om-03 (Effective Date May 13, 2003)

The three composition resins were compared against Example 1 alone with results as reported in the following table:

TABLE 1

| Sample | Resin Dosage lb/ton | % of GPAM in Blend | Handsheet Strength Results | | % Dry Strength | % Wet Strength |
| | | | Dry Tensile BL mile | Wet Tensile BL mile | Gain over PAE Alone | Gain over PAE Alone |
| --- | --- | --- | --- | --- | --- | --- |
| Example 1 Control | 16 | 0 | 2.22 | 0.51 | 0 | 0 |
| Example 3 | 16 | 10 | 2.24 | 0.56 | 0.9 | 9.8 |
| Example 4 | 16 | 20 | 2.29 | 0.57 | 3.2 | 11.8 |
| Example 5 | 16 | 30 | 2.53 | 0.58 | 14.0 | 13.7 |

As these data show in table 1, by employing the method of the present invention for creating molecular weight enhanced compositions, the compositions provide improved dry and wet tensile strength as compared with polyamidoamine-epichlorohydrin (PAE) resin alone at an equal resin dosage level. The compositions with lower cationic charge density than PAE resin allows papermakers to target the high wet strength toweling machines to generate higher absolute wet strength not achievable with PAE wet strength resin alone. The compositions allow papermakers to increase the usage of recycled fibers and achieve dry tensile improvement typically not achievable with PAE wet strength resin alone.

In one embodiment of the present invention, dry ensile strength is at least 2.24 BL mile, 2.29 BL mile, 2.50 BL mile, 2.75 BL mile, or 3.0 BL mile as measured by TAPPI Test Method T494 om-01 (Effective Date Sep. 5, 2001). In a further embodiment, the % dry strength gain over using PAE alone is at least 0.9, 3.0, 5.0, 10.0, 14.0, or 20.0% where the dry strength is measured by TAPPI Test Method T494 om-01 (Effective Date Sep. 5, 2001).

In one embodiment of the present invention the wet tensile strength is at least 0.55, 0.56, 0.57, 0.58 or 0.60 BL mile as measured by TAPPI Test Method T456 om-03 (Effective Date May 13, 2003) where the test specimens were immersed in distilled water at 23.0±2° C. under the vacuum level of 21 inch Hg for 3 minutes for saturation. In a further embodiment, the % wet strength gain is at least 5, 10, 12, 15, or 20% as measured by TAPPI Test Method T456 om-03 (Effective Date May 13, 2003) where the test specimens were immersed in distilled water at 23.0±2° C. under the vacuum level of 21 inch Hg for 3 minutes for saturation.

Example 7

Composition with 50% of Glyoxalated Polyacrylamide Resin and 50% PAE Resin

A suitable 1 liter glass beaker was fitted with stirring apparatus. The beaker was charged with 399.2 g of the polyamidoamine-epichlorohydrin resin of Example 1 and 501 g of the polyacrylamide resin of Example 2. After the addition of the two components, the stirring apparatus turned on immediately. Initial viscosity of mixture was 96 cPs. The mixture temperature did not need to control, just maintained at the room temperature of around 25° C. The two components were maintained to mix at the speed rate of 500 RPM for 30 minutes, resulting in a viscosity increased product. The final mixed product is cationic and water-soluble, has a solids concentration of 22.22 wt. %, cationic charge of 1.27 meq/gram, a pH of 3.1 and a viscosity of 187 cPs at 25° C.

Example 8

Composition with 70% of Glyoxalated Polyacrylamide Resin and 30% PAE Resin

A suitable 1 liter glass beaker was fitted with stirring apparatus. The beaker was charged with 239.5 of polyamidoamine-epichlorohydrin resin of Example 1 and 701.4 g of the polyacrylamide resin of Example 2. After the addition of the two components, the stirring apparatus turned on immediately. Initial viscosity of mixture was 65 cPs. The mixture temperature did not need to control, just maintained at the room temperature of around 25° C. The two components were maintained to mix at the speed rate of 500 RPM for 30 minutes, resulting in a viscosity increased product. The final mixed product is cationic and water-soluble, has a solids concentration of 21.26 wt. %, cationic charge of 0.94 meq/gram, a pH of 3.2 and a viscosity of 108 cPs at 25° C.

Example 9

Procedure for Evaluation of Compositions for Repulpable Wet Strength Paper Grades Preparation of Handsheets The calculated data and results of the experimental data from the foregoing glyoxalated polyacrylamide/PAE resin compositions are illustrated in FIG. 1.

The pulp stock used in the handsheet work was composed of 70% unbleached southern pine kraft, 10% machine broke and 20% OCC (obtained from a commercial paperboard machine). The stock freeness was in the range of 670 CSF to 7010 CSF. The stock pH was 6.6. The stock pH was pre-adjusted to 5.0 by using sulfuric acid before addition of the strength additives. The composition resins were added at 5 lb/ton of pulp solids to a 0.3% consistency thin stock allowing a 1-minute mixing time (1000 rpm of mixing speed). To this were then added 4 lb/ton of rosin size (Novaflo 50) and 18 lb/ton of aluminum sulfate to simulate the wet strength paper machine wet end chemistry condition. The treated stock was immediately poured into the headbox of the Noble & Wood handsheet machine containing pH pre-adjusted water (pH of 5.0). The target sheet basis weight was 70 lb/1000 ft$^2$. Each wet sheet was given two passes through the full load wet press, and then placed on the 105° C. drum dryer for 2 minutes. All sets of handsheets were further cured for 10 minutes at 105° C. in a forced air oven. The handsheet samples were continued at a constant humidity (50%) and at a constant temperature (73° F.) for 24 hours prior to physical testing. Dry tear and wet tear (test specimens immersed in distilled water at 23.0±2° C. under the vacuum level of 21 inch Hg for 3 minutes for saturation) were tested to measure improved paper dry and wet tear strength performance. Sheet repulpability was measured according to GP wet strength paperboard repulpability test method Dry tear measurement method refer to TAPPI Test Method T 414-om-04 (Effective date of Issue May 3, 2004)

Wet tear measurement determined by TAPPI Test Method T 414-om-04 (Effective date of Issue May 3, 2004) after the board has been immersed in distilled water for 3 minutes under the vacuum level of 21 inch Hg GP wet strength paperboard repulpability test method (described herein)

The two composition resins were compared against Example 1 and Example 2 with results as reported in the following table:

TABLE 2

| | | | Handsheet Strength Results | | |
|---|---|---|---|---|---|
| Sample | Resin Dosage lb/ton | % of GPAM in Blend | Dry Tear g · f | Wet Tear g · f | % Fiber Yield on Repulping |
| Example 1 Control | 5 | 0 | 741 | 661 | 32 |
| Example 2 Control | 5 | 100 | 754 | 390 | 91 |
| Example 7 | 5 | 50 | 779 | 587 | 64 |
| Example 8 | 5 | 70 | 747 | 540 | 87 |

As these data shown in table 2, the paper made of Example 1 (PAE resin) was not be defibered and repulped in neutral water without extraordinary means, resulting in 32% of fiber yield. Example 2 (the temporary wet strength resin) was hydrolytically unstable or shear sensitive. These properties enabled the resin to break down readily, generating the high fiber yield of 91% when the paper containing the resin was repulped in neutral water. However, the resin did not develop satisfactory wet tear strength for this paperboard application. This invention used the combination of example 1 and 2 at various ratios to create Example 7 and 8, which provided useful wet tear strengths and achieved adequate fiber yields on repulping. This invention has provided a novel solution to manufacture repulpable papers having satisfactory wet strength for most paperboard applications. The paperboard made of Example 8 is qualified as a repulpable wet strength paper because the repulping yield of the paper is greater than 70%. This invention has provided a novel solution to manufacture repulpable papers having satisfactory wet strength and repulping yields for most paperboard applications.

As these data show, by employing the method of the present invention for modifying the polyacrylamide composition, a composition of equivalent paper strengthening quality, as compared with the prior art, is obtained; while providing a composition of significantly improved stability and repulpability properties.

In one embodiment of the present invention, the % fiber yield on repulping is at least 40%, 45%, 50%, 55%, 60%, 65%, 70%, 75%, 80%, 85%, 90% or 95% as measured by the GP wet strength paperboard repulpability test method described herein.

In one embodiment of the present invention the dry tear strength is at least 742 g.f, 745 g.f, 750 g.f, 755 g.f, 760 g.f, 770 g.f, 780 g.f, 790 g.f, or 800 g.f as measured by TAPPI Test Method T 414-om-04 (Effective date of Issue May 3, 2004).

In one embodiment of the present invention the wet tear strength is at least 400 g.f, 450 g.f, 500 g.f, 550 g.f, 600 g.f, 650 g.f, 700 g.f, or 750 g.f as measured by TAPPI Test Method T 414-om-04 (Effective date of Issue May 3, 2004) after the board has been immersed in distilled water for 3 minutes under the vacuum level of 21 inch Hg In one embodiment, the present invention can be described as:

1. A composition for enhancing the wet strength of paper comprising a blend of two components:
   (a) a polymeric paper strengthening agent; and
   (b) a stabilized polyacrylamide in a concentration of between about 1% and about 99% by weight of the two components, wherein the stabilized polyacrylamide is prepared by (1) reacting a first portion of glyoxal with a polyacrylamide having pendant amide groups to form a first reaction mixture comprising polyacrylamide; (2) adding an acid to the first reaction mixture to form a second reaction mixture having a reduced pH and comprising the polyacrylamide; and (3) adding a second portion of glyoxal to the second reaction mixture to form the stabilized polyacrylamide.

2. The composition of any of the preceding paragraphs wherein the polyacrylamide is prepared by free radical polymerization of an acrylamide monomer in the presence of a cationic co-monomer.

3. The composition of any of the preceding paragraphs wherein the cationic co-monomer is selected from diallyl dimethyl ammonium chloride, 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methyl-sulfate, 3-acrylamido-3-methylbutyl trimethyl ammonium chloride, 2-(dimethylamino) ethyl acrylate, and mixtures thereof.

4. The composition of any of the preceding paragraphs wherein the polyacrylamide is prepared in the presence of a di-functional monomer to obtain a branched structure.

5. The composition of any of the preceding paragraphs wherein the di-functional monomer is selected from the group consisting of N,N'-methylene-bisacrylamide, N,N'-methylene-bismethacrylamide, N-allyl acrylamide, N-allyl methacrylamide and mixtures thereof.

6. The composition of any of the preceding paragraphs wherein the first portion of glyoxal is provided in an amount of 10 to 60 mole percent of the pendant amide groups.

7. The composition of any of the preceding paragraphs wherein the second portion of glyoxal is from about 1 to about 75 weight percent of the first portion of glyoxal.

8. The composition of any of the preceding paragraphs wherein the second portion of glyoxal is from about 4 to about 50 weight percent of the first portion of glyoxal.

9. The composition of any of the preceding paragraphs further comprising an aldehyde scavenger.

10. The composition of any of the preceding paragraphs wherein an aldehyde scavenger is included in one or more of step (1), step (2), step (3), and the stabilized polyacrylamide.

11. The composition of claim any of the preceding paragraphs wherein the aldehyde scavenger is selected from the group consisting of lactic acid, malic acid, citric acid, and choline chloride.

12. The composition of claim any of the preceding paragraphs wherein the aldehyde scavenger is used in an amount of 0.0001 to 0.25 mole per mole of total glyoxal.

13. The composition of claim any of the preceding paragraphs wherein the aldehyde scavenger has the structure:

$$H_3C-\underset{\underset{CH_3}{|}}{\overset{\overset{CH_3}{|}}{N^+}}-CH_2-CH_2-O\diagdown_{CH_2}\diagup CH-\underset{\underset{R^1}{|}}{\overset{\overset{O}{\|}}{C}}-\underset{}{\overset{R^2}{\underset{|}{N}H}} \quad A^-$$

wherein:
R$^1$ is hydrogen or C$_1$-C$_2$ alkyl;
R$^2$ is hydrogen or C$_1$-C$_4$ alkyl; and
A$^-$ is a compatible anion.

14. The composition of any of the preceding paragraphs wherein R$^1$ and R$^2$ are each hydrogen and A$^-$ is chloride.

15. The composition of any of the preceding paragraphs wherein the aldehyde scavenger is used in an amount of about 0.01 to about 0.3 moles per mole of glyoxal, about 0.1 to about 0.5 moles per mole of glyoxal, or about 0.7 to about 1.5 moles per mole of glyoxal.

16. The composition of any of the preceding paragraphs wherein the polymeric paper strengthening agent is a polymeric wet strengthening agent.

17. The composition of any of the preceding paragraphs wherein the polymeric wet strengthening agent comprises a copolymer.

18. The composition of any of the preceding paragraphs wherein the polymeric wet strengthening agent comprises a homopolymer.

19. The composition of any of the preceding paragraphs wherein the polymeric wet strengthening agent comprises one or more of a cationic polymer, an anionic polymer, and a neutral polymer.

20. The composition of any of the preceding paragraphs wherein the polymeric wet strengthening agent comprises a cationic polymer and the cationic polymer is selected from the group consisting of poly(diallyl dimethyl ammonium chloride) (polyDADMAC), polyamidoamine (prepolymer), polyamidoamine-Epi (AMRES®), a DADMAC copolymer, a cationic styrene maleic anhydride (SMA), a cationic latex, and mixtures thereof.

21. The composition of any of the preceding paragraphs wherein the polymeric wet strengthening agent comprises an anionic polymer and the anionic polymer is selected from the group consisting of an acrylamide-acrylic acid copolymer, a styrene acrylic acid copolymer, a styrene maleic anhydride copolymer, a styrene-acrylic acid—hydroxyethyl acrylate copolymer, carboxymethylcellulose (CMC), an anionic latex, and mixtures thereof.

22. The composition of any of the preceding paragraphs wherein the polymeric wet strengthening agent comprises a neutral polymer and the neutral polymer is selected from the group consisting of polyvinyl alcohol, a starch, polyhycroxyethyl acrylate, and mixtures thereof.

23. A composition for enhancing the wet strength of paper comprising a blend of two components:
  (a) a polyamidoamine-Epi polymer; and
  (b) a stabilized polyacrylamide in a concentration of between about 1% and about 99% by weight of the two components, wherein the polyacrylamide is prepared by (1) reacting a first portion of glyoxal with a polyacrylamide having pendant amide groups to form a first reaction mixture comprising polyacrylamide; (2) adding an acid to the first reaction mixture to form a second reaction mixture having a reduced pH and comprising the polyacrylamide; and (3) adding a second portion of glyoxal to the second reaction mixture to form the stabilized polyacrylamide.

24. The composition of any of the preceding paragraphs wherein an aldehyde scavenger having the structure:

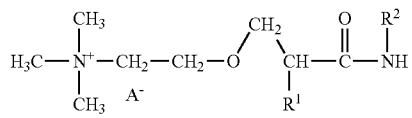

is included in one or more of step (1), step (2), step (3), and the stabilized polyacrylamide.

25. The composition of any of the preceding paragraphs wherein $R^1$ and $R^2$ are each hydrogen and $A^-$ is chloride.

25. Paper strengthened with the composition of any of the preceding paragraphs.

26. Paper strengthened with the composition of any of the preceding paragraphs.

27. The composition of any of the preceding paragraphs wherein the stabilized polyacrylamide is in a concentration of between 10% and 70% by weight of the two components.

27. The composition of any of the preceding paragraphs wherein the stabilized polyacrylamide is in a concentration of between 1% and 40% by weight of the two components.

27. The composition of any of the preceding paragraphs wherein the stabilized polyacrylamide is in a concentration of between 10% and 40% by weight of the two components.

The GP Wet Strength Paperboard Repulpability Test Method

Equipment: Maelstrom Laboratory Repulper (Adirondack Machine Corporation).

Repulping Conditions

| Stock Consistency: | 3.5% |
| Stock pH: | 7.0 ± 0.5 |
| Total Volume per Batch: | 3.0 liter |
| Pulping Temp: | 130 ± 20° F. |
| Dwell Time; | 30 minutes |

Materials:

3850 g water at 60-65° C., 150 g of paper, NaOH solution of known concentration (0.5 N).

1. Add 3850 g of DI water and adjust the pH to 8.5 using NaOH solution and warm the water to 60 C.

2. Turn on the repulper at the speed of 1000 RPM, then add the paper to the water within about 2 minutes and start timing after the paper has been added.

3. After repulping for 5 minutes, check the pH of the mixture and adjust to 8.5 if it is below 8.5. This helps to get the pH back to 8.5 if the paper contains a high dosage rate of alum. Once this is done, the pH need not be adjusted further. Typically, the final pH is around 6.5 to 7.0 after 60 minutes of repulping depending on the amount of alum in the paper.

4. Sample the pulp slurry (about 200 to 250 g) at 15-minute intervals of repulping for 60 minutes.

5. Screen the sampled pulp through a vibrating screen as described in the following procedure.

Note: By using the above procedure, typically about 2.8-3.0 pounds of caustic (NaOH) will be required for a ton of unbleached board containing 5#/ton of wet strength resin, 15#/T of rosin size and 40#/ton of alum. If the paperboard has alum in it, then substantially higher dosage of caustic, 6-7 #/T of paper would be required for repulsing.

Screening of the Repulped Pulp for Rejects:

Equipment: A Valley vibrating screen with 0.006-inch slots (A six-cut Valley Screen-Voith) is used for estimating the % fiber rejects, a water source and a stainless steel basket with fine mesh for collecting the passed fiber.

1. Turn on the motor of the Valley screen vibrator.

2. Fill the reservoir of the valley screen with the outlet closed.

3. Open the outlet and make sure the water flow into the reservoir and the outlet flow rates are same so that a constant volume is maintained in the reservoir, about 2 inches above the screen plate.

4. Carefully transfer the sampled pulp, about 200 g (~7.5 g of dry fiber) into the reservoir and rinse the sample container into the reservoir.

5. Let the pulp pass through the vibrating screen for at least 20 minutes or until all acceptable fibers are collected at the outlet screen.

6. Turn off the water and allow the reservoir to drain completely through the outlet screen.

7. Collect all the fiber left on the vibrating screen (REJECTS) and squeeze the water off. Place it on a pre weighed paper cup.

8. Collect all the fiber on the outlet basket screen (ACCEPTS) as described in #7.

9. Dry the paper cups along with the fibers at 105 C for 24 hours.

10. After 24 hours, place the cups in desiccators until they cool down to the room temperature and re-weigh.

11. The paper repulpability rate is calculated as follows:
X1=Wt. of fiber that remained on the vibrating screen
X2=Wt of fiber passed through the screen
% REJECTS=X1/(X1+X2)*100

GP Analytical Method 2187.5

Apparatus
1. Brookfield Model LVDV-II+ viscometer
2. Spindles, number 18 and 31
3. Small sample adapter
4. Refrigerated circulating water bath. Ex. Bellingham and Stanley Model 9105BS
5. Removable sample chamber
6. IBM Thinkpad Computer or Seiko Model DPU-411 printer and serial cable
7. NIST certified thermometer: div. of 0.05° C. and range of 24 to 38° C. Ex. ERTCO SRM934FC Reagents NIST Certified Viscosity Standards (available in viscosities from 5 cps to 100,000 cps.)

Calibration

The LVDV-II+ viscometer is calibrated at the factory for viscosity and temperature; no mechanism exists for recalibration of either parameter in the field. The accuracy and repeatability of viscosity readings are affected by bent spindles, temperature extremes, and damage or wear to the bearing and pivot point. Therefore, perform an autozero and bearing check on each viscometer on a regular basis as outlined in Appendix D. A calibration verification using an NIST certified standard is required to quantify accuracy and repeatability of viscosity readings and is recommended at least once per month.

It is required that each viscometer be returned to Brookfield Laboratories for service and certification after 12 months use. Daily instrument checks or monthly calibration verifications may indicate that the unit be returned more often.

Procedure

NOTE 1: An alternate Procedure using a computer is described in the Appendix.

NOTE 2: When determining the viscosity with this method only, the temperature lead between the small sample adapter and the viscometer head is disconnected and not used. Steps 1 and 2 do not have to be done for each measurement, but verified on a regular basis.

1. Ensure the viscometer is level. The water bath setpoint should result in a water temperature in the viscometer sample chamber of 25.0° C. Fill a sample chamber with water and verify the 25.0° C. reading using the NIST thermometer.

2. Ensure the print interval is set for 10 seconds.

3. Set spindle speed and spindle number so expected reading is between 40 to 90% of maximum range (Appendix A). For example, when measuring a 1000 cps resin with a number 31 spindle, set the speed at 20 rpm 4. Adjust sample in a water bath to 23-27° C., avoid vigorous stirring to minimize air bubble entrapment. NOTE: The closer the sample temperature is to 25.0° C., the quicker the sample will equilibrate to 25.0° C. The jacket will cool or heat the chamber, sample, and spindle until the temperature of the sample immediately surrounding the spindle is 25° C.

5. Fill the removable sample chamber with the correct volume of sample fluid by tilting the chamber and pouring sample fluid slowly down the side wall. The sample volume required is 10 ml for a number 31 spindle and 8 ml for a number 18 spindle.

6. Slowly lower spindle into sample fluid in sample chamber. The liquid level should be ~0.5 inch below the top of the sample chamber for a number 31 spindle and ~0.2 inch for a number 18 spindle.

7. Insert sample chamber in jacket and lock into place.

8. Connect extension link to spindle. Connect the link to loop on coupling nut. Place insulating cap on sample chamber if sample contains solvents that are highly volatile, such as methanol, ethanol, IPA, etc.

9. Press MOTOR ON/OFF button on viscometer to begin reading viscosity measurements. Watch the printer to ensure that the % output (column 4) is above 40% (FIG. 1). Watch the printer readout and after three equal % output readings (example, FIG. 1), press MOTOR ON/OFF button. Record the viscosity that corresponds to the % output value.

Calculations

The LVDV-II+ viscometer reads viscosity directly so no calculations are necessary. Three equal % output readings

| | | | | | | |
|---|---|---|---|---|---|---|
| RPM = 100 | MD = LV | SPDL = 31 | % = -0.0 | cP = ---- | D/CM2 = ---- | 1/SEC = 0.00 | T = ----C |
| RPM = 100 | MD = LV | SPDL = 31 | % = 64.6 | cP = 193.8 | D/CM2 = 65.9 | 1/SEC = 34.0 | T = ----C |
| RPM = 100 | MD = LV | SPDL = 31 | % = 64.6 | cP = 193.8 | D/CM2 = 65.9 | 1/SEC = 34.0 | T = ----C |
| RPM = 100 | MD = LV | SPDL = 31 | % = 64.7 | cP = 194.1 | D/CM2 = 66.0 | 1/SEC = 34.0 | T = ----C |
| RPM = 100 | MD = LV | SPDL = 31 | % = 64.6 | cP = 193.8 | D/CM2 = 65.9 | 1/SEC = 34.0 | T = ----C |
| RPM = 100 | MD = LV | SPDL = 31 | % = 64.6 | cP = 193.8 | D/CM2 = 65.9 | 1/SEC = 34.0 | T = ----C |
| RPM = 100 | MD = LV | SPDL = 31 | % = 64.7 | cP = 194.1 | D/CM2 = 66.0 | 1/SEC = 34.0 | T = ----C |
| RPM = 100 | MD = LV | SPDL = 31 | % = 64.6 | cP = 193.8 | D/CM2 = 65.9 | 1/SEC = 34.0 | T = ----C |

Precision

The mean and relative standard deviation of ten replicate determinations for a UF resin sample and Cannon silicone standard was as follows:

|  | RUUB3650 | Cannon Standard |
|---|---|---|
| mean | 273.9 cps | 484.7 cps |
| standard deviation | 1.037 | 2.226 |
| relative standard deviation | 0.38% | 0.46% |

GP Analytical Method 2610.2

Apparatus
1. Muetek PCD 03 Particle Charge Detector
2. Muetek PCD—Two Version II Automatic Titrator
3. Analytical Balance (0.0001 gram; Sartorius Model 1620-MP or equivalent)
4. pH meter (Fisher Accumet AR25, #13-636-AR25, or equivalent)
5. Magnetic stirrer (Fisher #14-493-1205 or equivalent) with stir bars (½", Fisher #14-511-62 or equivalent)
6. Disposable pipettes (Samco transfer pipets, cat. No. 202 or equivalent)
7. 10 mL Volumetric transfer pipette (Fisher #13-650-2L or equivalent)
8. 100 ml Volumetric flask (Pyrex No. 5660 or equivalent)
9. 150 mL beaker (Pyrex No. 1000 or equivalent)

Reagents
1. De-ionized water, lab preparation
2. Nalco PVSK 0.0025N, standard reagent (Nalco 460-S5434)
3. Nalco PolyDADMAC 0.005N, standard reagent (Nalco 460-S5433)
4. Sodium Hydroxide 0.1N, certified standard (Fisher Catalog SS276-1)
5. Sodium Hydroxide solution 0.1%, lab preparation (2 g Sodium Hydroxide 50% w/w diluted to 1000 mL; Fisher SS254-4 50% Sodium Hydroxide solution)
6. Sulfuric Acid 0.1N, certified standard (Fisher Catalog SA220-1)
7. Sulfuric Acid solution 0.1%, lab preparation (1.04 g Sulfuric Acid 95-98% diluted to 1000 mL; Fisher A300-212 Conc. Sulfuric Acid Solution).
8. pH 4 buffer (Fisher SB101-4)
9. pH 7 buffer (Fisher SB107-4)

Calibration

Calibrate the pH meter at pH 4 and pH 7 using NIST certified standard buffer solutions.

Check pH of PVSK titrant solution. The PVSK titrant should be at pH=6.8-7.0. If PVSK pH is less than 6.8, then adjust first with 10% KOH (DO NOT USE NaOH) to approx. pH 6.2, then with 0.1% KOH to approx. pH 7.0.

PVSK normality should be determined each time the pH is adjusted, when the PVSK reservoir is refilled, and at the beginning of each shift in the case of continuous plant operations. In the case of R&D operations the PVSK normality should be determined each time pH is adjusted, when the PVSK reservoir is refilled, and at the beginning of each day of operations.

Determine Normality of PVSK titrant solution (see Appendix).
1. Rinse PVSK Burette.
2. Pipette 10 mL of 0.005 N Poly-DADMAC into the measuring cell.
3. Titrate with PVSK to obtain endpoint in mL PVSK.
4. Calculate PVSK Normality for use in Titration Procedure.

Procedure
1. Perform titrations in duplicate for samples at either pH 4 or pH 8.
2. Determine non-volatiles content of resin using AM2156.6, or AM2156.7, or RI-Solids Table (See Appendix for example).
3. Prepare 100 mL of Stock Solution at 0.01% concentration, using non-volatiles (See Appendix for example).
4. Transfer stock solution to 150 mL beaker, add stir bar.
5. Adjust pH of beaker to either pH 4 or pH 8, using 0.1% sulfuric acid or 0.1% sodium hydroxide solution.
6. Pipette 10 mL of stock solution into measuring cell and insert piston.
7. Titrate with PVSK to endpoint and calculate Charge Density.

Calculations $$PVSK\ Normality = PVSK(\overline{N}) = \frac{DADMAC(\overline{N}) * DADMAC(mL)}{PVSK(mL)}$$

Concentration of Resin Stock Solution: Concentration =

$$\frac{Grams\ Resin(liquid) * \%\ NV}{100\ mL}$$

$$Charge\ Density = \frac{PVSK(mL) * PVSK(\overline{N})}{GramActiveResin}$$

Precision
Muetek PCD 03 Charge Density (NB #230G02)
Amres 25-HP, EUG #102270, Apr. 15, 2002
NB #215G99-2
Samples at pH 8

| Run # | Chg Den |
|---|---|
| 1 | 2.237 |
| 2 | 2.275 |
| 3 | 2.356 |
| 4 | 2.261 |
| 5 | 2.315 |
| 6 | 2.302 |
| 7 | 2.246 |
| 8 | 2.328 |
| 9 | 2.303 |
| 10 | 2.363 |

AVG 2.299
STD 0.044
RSD % 1.898

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%.

While the invention has been described in conjunction with specific embodiments thereof, the foregoing description and examples are intended to illustrate, but not limit the scope of the invention. Other aspects, advantages and modifications will be apparent to those skilled in the art to which the invention pertains. These aspects and modifications are within the scope of the invention, which is limited only by the appended claims.

The invention claimed is:

1. A composition for enhancing the wet strength of paper comprising a blend of two components:
   (a) a polymeric paper strengthening agent; and
   (b) a stabilized glyoxalated polyacrylamide in a concentration of between about 1% and about 35% by weight of the two components, wherein the stabilized glyoxalated polyacrylamide is prepared by (1) reacting a first portion of glyoxal with a polyacrylamide having pendant amide groups to form a first reaction mixture comprising glyoxalated polyacrylamide; (2) adding an acid to the first reaction mixture to form a second reaction mixture having a reduced pH and comprising the glyoxalated polyacrylamide; and (3) adding a second portion of glyoxal to the second reaction mixture to form the stabilized glyoxalated polyacrylamide.

2. The composition of claim 1 wherein the polyacrylamide is prepared by free radical polymerization of an acrylamide monomer in the presence of a cationic co-monomer.

3. The composition of claim 2 wherein the cationic co-monomer is selected from diallyl dimethyl ammonium chloride, 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino)ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride, 2-(dimethylamino)ethyl acrylate, and mixtures thereof.

4. The composition of claim 1 wherein the polyacrylamide is prepared in the presence of a di-functional monomer to obtain a branched structure.

5. The composition of claim 4 wherein the di-functional monomer is selected from the group consisting of N,N'-methylene-bisacrylamide, N,N'-methylenebismethacrylamide, N-allyl acrylamide, N-allyl methacrylamide and mixtures thereof.

6. The composition of claim 1 wherein the first portion of glyoxal is provided in an amount of 10 to 60 mole percent of the pendant amide groups.

7. The composition of claim 6 wherein the second portion of glyoxal is from about 1 to about 75 weight percent of the first portion of glyoxal.

8. The composition of claim 6 wherein the second portion of glyoxal is from about 4 to about 50 weight percent of the first portion of glyoxal.

9. The composition of claim 1 further comprising an aldehyde scavenger.

10. The composition of claim 1 wherein an aldehyde scavenger is included in one or more of step (1), step (2), step (3), and the stabilized glyoxalated polyacrylamide.

11. The composition of claim 9 wherein the aldehyde scavenger is selected from the group consisting of lactic acid, malic acid, citric acid, and choline chloride.

12. The composition of claim 9 wherein the aldehyde scavenger is used in an amount of 0.0001 to 0.25 mole per mole of total glyoxal.

13. The composition of claim 9 wherein the aldehyde scavenger has the structure:

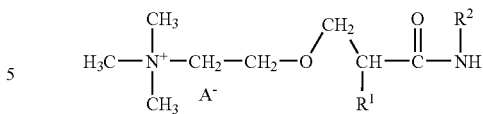

wherein:
$R^1$ is hydrogen or $C_1$-$C_2$ alkyl;
$R^2$ is hydrogen or $C_1$-$C_4$ alkyl; and
$A^-$ is a compatible anion.

14. The composition of claim 13 wherein $R^1$ and $R^2$ are each hydrogen and $A^-$ is chloride.

15. The composition of claim 13 wherein the aldehyde scavenger is used in an amount selected from (1) about 0.01 to about 0.3 moles per mole of glyoxal, (2) about 0.1 to about 0.5 moles per mole of glyoxal, or (3) about 0.7 to about 1.5 moles per mole of glyoxal.

16. The composition of claim 13 wherein the polymeric paper strengthening agent is a polymeric wet strengthening agent.

17. The composition of claim 16 wherein the polymeric wet strengthening agent comprises a copolymer.

18. The composition of claim 16 wherein the polymeric wet strengthening agent comprises a homopolymer.

19. The composition of claim 16 wherein the polymeric wet strengthening agent comprises one or more of a cationic polymer, an anionic polymer, and a neutral polymer.

20. The composition of claim 19 wherein the polymeric wet strengthening agent comprises a cationic polymer and the cationic polymer is selected from the group consisting of poly(diallyl dimethyl ammonium chloride) (polyDADMAC), polyamidoamine (prepolymer), polyamidoamine-Epi (AMRES®), a DADMAC copolymer, a cationic styrene maleic anhydride (SMA), a cationic latex, and mixtures thereof.

21. The composition of claim 19 wherein the polymeric wet strengthening agent comprises an anionic polymer and the anionic polymer is selected from the group consisting of an acrylamide-acrylic acid copolymer, a styrene acrylic acid copolymer, a styrene maleic anhydride copolymer, a styrene-acrylic acid—hydroxyethyl acrylate copolymer, carboxymethylcellulose (CMC), an anionic latex, and mixtures thereof.

22. The composition of claim 19 wherein the polymeric wet strengthening agent comprises a neutral polymer and the neutral polymer is selected from the group consisting of polyvinyl alcohol, a starch, polyhydroxyethyl acrylate, and mixtures thereof.

23. A composition for enhancing the wet strength of paper comprising a blend of two components:
   (a) a polyamidoamine-Epi polymer; and
   (b) a stabilized glyoxalated polyacrylamide in a concentration of between about 1% and about 35% by weight of the two components, wherein the glyoxalated polyacrylamide is prepared by (1) reacting a first portion of glyoxal with a polyacrylamide having pendant amide groups to form a first reaction mixture comprising glyoxalated polyacrylamide; (2) adding an acid to the first reaction mixture to form a second reaction mixture having a reduced pH and comprising the glyoxalated polyacrylamide; and (3) adding a second portion of glyoxal to the second reaction mixture to form the stabilized glyoxalated polyacrylamide.

24. The composition of claim 23 wherein an aldehyde scavenger which has the structure:

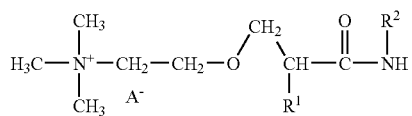

is included in one or more of step (1), step (2), step (3), and the stabilized glyoxalated polyacrylamide and wherein:

$R^1$ is hydrogen or $C_1$-$C_2$ alkyl;
$R^2$ is hydrogen or $C_1$-$C_4$ alkyl; and
$A^-$ is a compatible anion.

25. Paper strengthened with the composition of claim 23.

26. The composition of claim 24 wherein $R^1$ and $R^2$ are each hydrogen and $A^-$ is chloride.

27. Paper strengthened with the composition of claim 1.

* * * * *